(12) United States Patent
Wolff (10) Patent No.: US 7,186,291 B2
(45) Date of Patent: Mar. 6, 2007

(54) FUEL TANK VENTING SYSTEM AND AN ADDITIONAL FILTER ELEMENT THEREFOR

(75) Inventor: Thomas Wolff, Munchberg (DE)

(73) Assignee: Helsa-Automotive GmbH & Co., Gefrees (DE)

( * ) Notice: Subject to any disclaimer, the term of this patent is extended or adjusted under 35 U.S.C. 154(b) by 200 days.

(21) Appl. No.: 10/771,712

(22) Filed: Feb. 4, 2004

(65) Prior Publication Data

US 2005/0132888 A1    Jun. 23, 2005

(30) Foreign Application Priority Data

Dec. 22, 2003   (DE)   ................................ 103 61 090

(51) Int. Cl.
*B01D 53/02* (2006.01)
(52) U.S. Cl. ............................ 96/132; 96/134; 96/153; 502/416
(58) Field of Classification Search ................. 96/108, 96/132, 134, 135, 147, 153; 95/901; 123/518–521; 502/416
See application file for complete search history.

(56) References Cited

U.S. PATENT DOCUMENTS

| | | | |
|---|---|---|---|
| 4,386,947 A | | 6/1983 | Mizuno et al. |
| 5,710,092 A | * | 1/1998 | Baker .......................... 502/416 |
| 5,925,168 A | * | 7/1999 | Judkins et al. .................. 95/27 |
| 6,030,698 A | * | 2/2000 | Burchell et al. .......... 428/315.5 |
| 6,057,262 A | * | 5/2000 | Derbyshire et al. .......... 502/423 |
| 6,251,822 B1 | * | 6/2001 | Peng et al. .................. 502/423 |
| 6,503,301 B2 | | 1/2003 | Uchino et al. |
| 6,537,355 B2 | | 3/2003 | Scardino et al. |
| 6,540,815 B1 | | 4/2003 | Hiltzik et al. |
| 6,812,187 B1 | * | 11/2004 | Pak et al. .................... 502/180 |
| 2001/0042440 A1 | * | 11/2001 | Miyazawa et al. ............. 95/139 |
| 2003/0116021 A1 | * | 6/2003 | Oda et al. ..................... 96/134 |
| 2003/0196553 A1 | * | 10/2003 | Mochizuki et al. ........... 96/153 |

FOREIGN PATENT DOCUMENTS

| | | |
|---|---|---|
| DE | 19952092 | 10/2000 |
| DE | 10049537 | 4/2002 |
| DE | 10104882 | 8/2002 |

* cited by examiner

*Primary Examiner*—Frank M. Lawrence
(74) *Attorney, Agent, or Firm*—Jan K. Simpson; Fulbright & Jaworski LLP (57) ABSTRACT

Described is an additional filter element for a filter apparatus for reducing emissions from a motor vehicle tank venting system. The additional filter element is connected to a main activated carbon filter and has adsorbents which, to achieve a high working capacity, in particular at 42° C., has a high micropore volume. To retain a residual loading possibly present in the micropores the adsorbents further have a mesopore volume. The micropore volume is at least 0.4 cm$^3$/g and the mesopore volume is at a maximum 0.95 cm$^3$/g.

19 Claims, 6 Drawing Sheets

FUEL TANK VENTING SYSTEM AND AN ADDITIONAL FILTER ELEMENT THEREFOR

CROSS-REFERENCE TO RELATED APPLICATIONS

This application claims the priority of German patent application Serial No 103 61 090.1 filed Dec. 22, 2003, the subject-matter of which is incorporated herein by reference.

TECHNICAL FIELD

The invention concerns an additional filter element for a filter apparatus, more especially for reducing emissions from a tank venting system of a motor vehicle. The additional filter element is suitable for being connected to a main activated carbon filter of the venting system.

The invention further concerns a fuel tank venting system including a filter arrangement with an additional filter element.

BACKGROUND OF THE INVENTION

Under the new regulations for the reduction of hydrocarbon emissions from passenger cars in California and what are referred to as the green States in the United States of America, in which respect reference is made to low-emission vehicles (LEV), zero-emission vehicle (ZEV) and partial zero-emission vehicles (PZEV), the aim of the manufacturers of automobile tank venting systems having an activated carbon filter is to appropriately reduce the levels of emissions from the activated carbon filter. Multi-chamber systems or additional filter elements are used for main activated carbon filters, in order to reduce the emissions therefrom.

The actual activated carbon filter itself may be in the form of a canister with a loose activated carbon fill. The canister serves to trap the hydrocarbons which issue from the fuel tank of a motor vehicle while the vehicle tank is being filled. During operation of the vehicle it is back-flushed again with a defined amount of air and desorption takes place. The desorbed air is fed to the combustion air being passed to the engine. If for example the motor vehicle remains standing in the sun after such a desorption process has taken place, the vehicle heats up and therewith also the fuel tank together with its activated carbon filter. The heating effect has two consequences, as follows:

1. further hydrocarbons escape from the fuel tank and they again load the activated carbon filter, and
2. the activated carbon filter itself desorbs a given amount of hydrocarbons into the atmosphere, from the residual loading of the activated carbon filter, that is to say from the amount of hydrocarbons which, in the desorption operation, were not able to be completely flushed out of the activated carbon.

The above-mentioned new regulations known as LEV II and PZEV respectively provide that a passenger car or like vehicle as defined therein may only discharge a maximum of 0.5 g and 0.35 g respectively of hydrocarbons per day. That value is distributed to corresponding components by the individual automobile manufacturers, in which respect the emissions guideline value for the tank venting system of a passenger car is set at a maximum of 10 mg of hydrocarbon per day. It will be appreciated that the value of 10 mg per day is the level of emissions which may still be discharged to the atmosphere from the activated carbon canister on a daily basis.

Basically multi-chamber systems are used for the main canister in order to attain that aim. Such multi-chamber systems form additional diffusion paths for the gasoline vapor, and such paths result in a marked delay in the escape of gasoline vapor from the tank to the ambient atmosphere.

In this respect attention may be directed to U.S. Pat. No. 6,503,301 describing a multi-chamber system in which a chamber which is towards the atmosphere, besides the adsorbent, also contains a material with a high thermal capacity. That material is intended to receive the adsorption heat and thus increase the adsorption capacity of the chamber.

Reference may also be made to DE 199 52 092 C1 disclosing a multi-chamber system, wherein provided on the atmosphere side is an additional adsorptive volume which is intended to trap the residual emissions from the main activated carbon filter. Adsorption agents which may be used for that additional volume are silica gel, zeolites or ion exchangers. However, in comparison with the activated carbon, those adsorption agents involve only a very limited adsorption capacity and it is only with difficulty that they can be regenerated with air at ambient temperature. An activated carbon cloth or gauze which is also referred to therein can admittedly be satisfactorily regenerated but it only has a very limited adsorption capacity.

Consideration may be given here to DE 100 49 437 setting out a main activated carbon filter having an additional filter element, wherein the additional filter element has the property that it can be desorbed substantially more rapidly, in comparison with the main activated carbon filter, because the additional filter element is of a small size. A preferred material for that additional filter element is a non-woven fabric which is coated with activated carbon and which is rolled up to form a cylinder, with the gas flowing therethrough in the longitudinal direction of the cylinder. That additional filter element however suffers from the deficiency that it produces an additional differential pressure which is generally very high by virtue of the dense winding structure that it entails.

An SAE Paper 2001-01-0733 by Westvaco, dating from the year 2001, sets out a particularly advantageous structural configuration for an additional filter element. The unit therein employs honeycomb activated carbon filters which are distinguished by involving a particularly low differential pressure. In addition, by virtue of their small size, like also that described in above-discussed DE 100 49 537, those honeycomb activated carbon filters can be regenerated significantly more quickly than the main activated carbon filter.

Reference may be made to U.S. Pat. No. 6,537,355 disclosing a particular design of a honeycomb activated carbon filter, more specifically an activated carbon monolith, with a special sealing system.

The use of a honeycomb structure of activated carbon in a tank venting system is also described in U.S. Pat. No. 4,386,947. That specification explicitly refers to the good adsorption and desorption characteristics, by virtue of a uniform passage structure provided therein. Multi-chamber systems using such honeycomb structures are also described therein.

It will be noted that all the above-discussed systems disclosed hitherto are multi-chamber systems comprising at least two adsorptive volumes. The problem involved in the reduction of residual emissions however does not just entail providing a filter volume which has as good a desorbent effect as possible on the atmosphere side of the filter system, but rather the filter volume in question must afford quite specific properties so that it functions properly in the relevant situation of use. After that filter element has been flushed free it must have a residual capacity for hydrocarbons which can escape from the main canister constituting the main activated carbon filter. That residual capacity must be maintained when there is an increase in temperature from for example 20° C. to 42° C. In addition, if it transpires that the filter element has not discharged all previously adsorbed hydrocarbons again in the flushing process, the filter element is not to discharge them again due to a rise in temperature from for example 20° C. to 42° C.

That rise in temperature from 20° C. to 42° C. results from a prescribed test procedure specified by the California Air Research Board which can be referred to for brevity as the CARB, whereby a complete fuel tank venting system is subjected to a pre-ageing procedure in a defined manner in such a way that, in a predetermined number of operating cycles, it is loaded with hydrocarbons and repeatedly flushed clear again. The levels of emission are then recorded over a 2 or 3 day cycle. In the course of that test procedure, the entire fuel tank venting system is heated once per day from 20° C. to 42° C. and then cooled down again. In that procedure, on the one hand fuel vapors are caused to evaporate from the tank and are caught by the main activated carbon filter, while on the other hand hydrocarbons are desorbed from the main activated carbon filter and have to be trapped by the additional filter element.

The fuel vapors which are caused to evaporate from the tank during a tank refuelling operation and which are caught in the main activated carbon filter are fractionated there. The higher-boiling components are adsorbed the best while the low-boiling components such as n-butane, n-pentane, n-hexane and n-heptane are worst adsorbed. For that reason it is assumed that, after a given number of cycles, in the tank refuelling procedure, downstream of the main activated carbon filter, the above-listed substances from C4, namely n-butane, through C7, namely n-heptane, break through and load up the additional filter element. As no increase in temperature occurs during regeneration of the system by the flushing procedure and as the flushing times employed are generally very short, a residual loading also remains at the additional filter element. In that situation, with an increasing number of ageing cycles, n-heptane will increasingly collect at the additional filter element as a residual loading thereat, as that substance has the highest boiling point of the four hydrocarbons listed above. The other hydrocarbons with $C_4$ through $C_6$ are increasingly displaced. It is further assumed that, after a given number of ageing cycles, in the phase involving the increase in temperature to 42° C., it is only n-butane that still escapes from the main activated carbon filter as that substance has the lowest boiling point. Consequently the additional filter element must behave sorptively in such a way that the emission level is a maximum of 10 mg per day, in spite of the residual loading of the additional filter element, an increase in temperature from 20° C. to 42° C. and an additional n-butane loading stemming from the main activated carbon filter.

In this respect therefore the present invention seeks to provide a method of describing the sorption behaviour and characteristics of such an additional filter element so that, in conjunction with a main activated carbon filter such as an activated carbon canister, the additional filter element affords an overall system which at a maximum produces an emission of 10 mg of hydrocarbons per day.

Consideration may be given in this context to U.S. Pat. No. 6,540,815 in which an attempt has already been made to describe the adsorption behaviour of such an additional filter element. The procedure adopted therein however only involves looking at the adsorption isotherms. It is stated that, when the adsorption isotherms of the additional filter element are of a shallow configuration, it is possible to achieve a particularly good reduction in the overall levels of emission. The additional filter element is described in conjunction with the properties of the main activated carbon filter. The first filter element which is towards the tank side exhibits a steep gradient in respect of the isotherms when high levels of concentration are involved and between 5 and 50% of n-butane in air is said to have an incremental adsorption capacity of more than 35 g/l while the second filter element which is towards the atmosphere side, at high levels of concentration, exhibits a shallow configuration in respect of the isotherms and is said to have an incremental adsorption capacity of less than 35 g/l at between 5 and 50% of n-butane in air. The steep isotherm configuration of the first filter element describes the characteristics of typical known tank venting carbons.

Above-discussed U.S. Pat. No. 6,540,815 specifies the isotherms for the tank venting carbons BAX1100 and BAX1500 from Westvaco, which involve two typical activated carbons which are used in the tank venting sector. The activated carbon CNR115 from Norit and the activated carbon FX1135 from Pica which are both also used in relation to tank venting exhibit a similarly steep gradient at high levels of concentration and are markedly above 35 g/l in the specified concentration range. The shallow configuration in relation to the additional filter element is achieved either by the choice of a suitable activated carbon such as for example that described in Embodiment 3 of U.S. Pat. No. 6,540,815 or by dilution of a tank venting carbon in accordance with Embodiments 1 and 2 of U.S. Pat. No. 6,540,815.

However, classification as steep and shallow adsorption isotherms, depending on the respective situation involved, does not necessarily describe a properly functional system. It is possible to produce an additional filter element on the basis of a honeycomb body which has a very shallow adsorption isotherm, and it is possible in that way to achieve a reduction in the levels of emission of the main activated carbon filter. However, depending on the respective situation of use concerned, that reduction may still not be sufficient. It was further found that, with a very low level of emission in respect of the main activated carbon filter in the range of between 10 and 50 mg/day, an additional filter element which, at a high level of emission, still afforded a very good reduction, here affords only a slight reduction or indeed no reduction at all.

Figure 1:
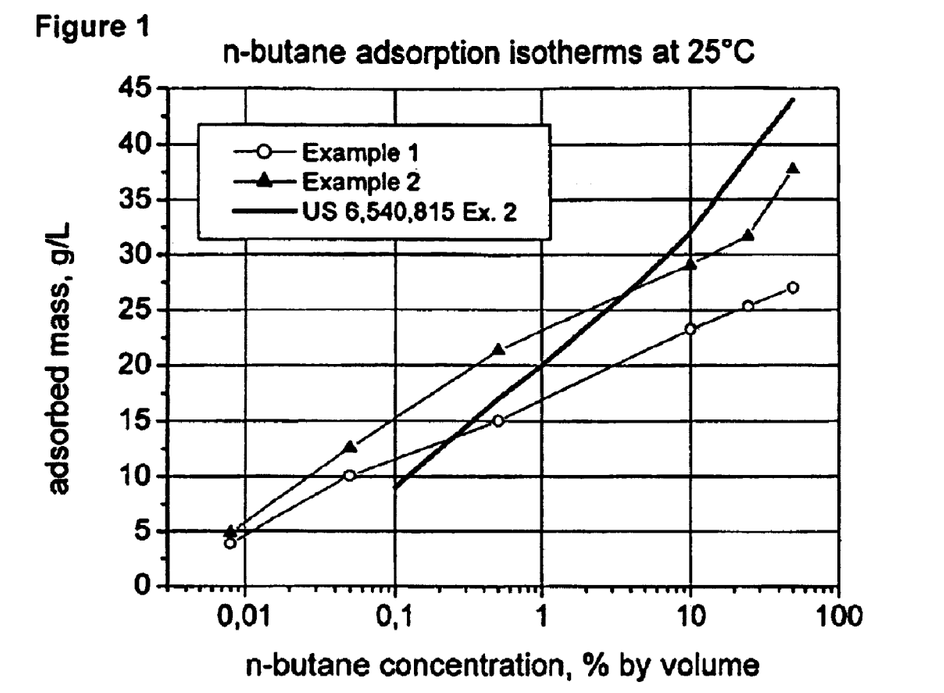
FIG. 1 is a graph showing the adsorption isotherms for three different additional filter elements.

Reference may be made at this juncture to FIG. 1 showing the adsorption isotherms for three different additional filter elements in the form of a honeycomb body consisting of or including activated carbon. Examples 1 and 2 were produced in accordance with DE 101 04 882 while the third curve in FIG. 1 shows Example 2 from U.S. Pat. No. 6,540,815. All Examples which are discussed in the latter publication are illustrated in summarising form in Table 1 hereinafter:

TABLE 1

| | B.E.T. surface area | Total pore volume | Micropore volume** | Mesopore volume*** | BWC in granule form+ | BWC in honeycomb structure++ |
|---|---|---|---|---|---|---|
| Example 1 | 2000 m²/g | 1.3 cm³/g | 0.1 cm³/g | — | 15 g/100 ml | 1.7 g |
| Example 2 | 1900 m²/g | 1.3 cm³/g | 0.8 cm³/g | 0.92 cm³/g | 10 g/100 ml | 1.85 g |
| Example 3 | 2000 m²/g | 1.6 cm³/g | 0.85 cm³/g | 0.92 cm³/g | 11 g/100 ml | 1.95 g |
| Example 4 | 2000 m²/g | 1.0 cm³/g | 0.85 cm³/g | 0.33 cm³/g | 10.5 g/100 ml | 2.3 g |
| U.S. Pat. No. 6 540 815 Example 2 | — | — | — | — | — | 2.4 g+++ |

BWC denotes butane working capacity
*from the nitrogen adsorption isotherm in accordance with Gurvitch
**from the nitrogen isotherm in accordance with Barrett, Joyner and Halenda
***from the mercury intrusion diagram calculated in accordance with the Washburn equation
+measured in accordance with ASTM-D5228-92 with 100% n-butane
D5228-92, loading with 50% of n-butane in air, 0.1 l/min desorption with 22 l/min for 15 minutes
+++calculated from the information in Table 1 of U.S. Pat. No. 6 540 815.

It is possible to clearly see the differences in pore distributions and the internal surface areas of the activated carbons used. Equally clear are the differences in the n-butane working capacity indicated as BWC. The operation of determining the butane working capacity on the activated carbon granules was carried out in accordance with ASTM-D5228-92 with 100% of butane. The operation of determining working capacity on the honeycomb structures was also implemented on the basis of ASTM-D5118-92. Loading was effected with 50% of n-butane in air at 0.1 l/min until a breakdown of 5000 ppm, followed then by desorption with 22 l/min for 15 minutes.

Figure 2:
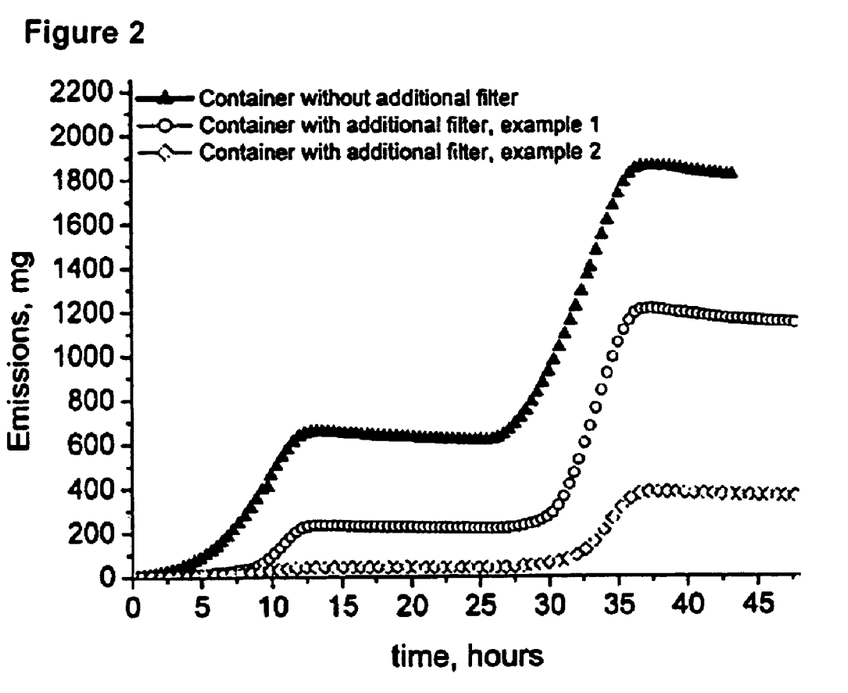
FIG. 2 is a graph showing levels of emissions of an activated carbon canister with and witout the filters from Examples 1 and 2.

FIG. 1 clearly shows that all three Examples illustrated exhibit a flat adsorption isotherm which applies in respect of the virgin condition, which in the region between 5% and 50% in the gradient are markedly below 35 g/l. Examples 1 and 2 therefore, like Example 3 of U.S. Pat. No. 6,540,815, should result in a reduction in the levels of hydrocarbon emissions. That fact is firstly made clearly by FIG. 2 showing the levels of emission of an activated carbon canister with and without the filters from Examples 1 and 2. The activated carbon canister itself has implemented markedly more than 100 cycles with fuel. For the measurement procedures, it was firstly loaded, with and without an additional filter element respectively, for three cycles with n-butane with a concentration of 50% in air until breakdown of 2 g, and was then backflushed with 300 l. After a rest period of 6 hours two heating cycles were started, during a period of two days. FIG. 2 clearly shows the reduction in the levels of emission by the use of an additional filter element. The filters from those two Examples are then subjected to measurement in tank venting systems using the same procedure but with markedly lower emissions in respect of the main activated carbon filter. The results from those two experiments are shown in Table 2 hereinafter.

TABLE 2

| | Emissions after 20 cycles preageing of the overall system with fuel | |
|---|---|---|
| | Activated carbon filter without additional filter | Activated carbon filter with additional filter |
| Example 1 | 33 mg/day | 31 mg/day |
| Example 2 | 7.95 mg/day | 10.3 mg/day |

It will be seen that no reductions in emission were achieved in both cases by virtue of the additional filter. In spite of the shallow nature of the adsorption isotherms of the additional filter elements, it was not possible to reduce the levels of emission from the main activated carbon filter.

BRIEF SUMMARY OF THE INVENTION

An object of the present invention is to provide a filter system for reducing levels of hydrocarbon emissions, which is capable of providing for enhanced reduction efficiency.

A further object of the present invention is to provide an additional filter element in a filter apparatus, more specifically for reducing emissions from a tank venting system for example of a motor vehicle, for connection to a main activated carbon filter, capable of ensuring a reduction in the levels of emission of hydrocarbons of below 10 mg/day or in each CARB test cycle.

Still another object of the present invention is to afford a fuel tank venting system including an additional filter element, which is operable to provide an effective venting action with an enhanced reduction in hydrocarbon emissions.

In accordance with the present invention the foregoing objects are attained by an additional filter element in a filter apparatus, more specifically for reducing levels of emission of a tank venting system for example of a motor vehicle, the element being connected in use to a main activated carbon filter, wherein the additional filter element has at least one adsorbent which, to achieve a high working capacity, in particular at 42° C., has a high micropore volume and which, to retain a residual loading which is possibly present in the micropores, has a mesopore volume.

According to the invention the foregoing objects are also attained by a hydrocarbon fuel tank venting system comprising a filter arrangement for reducing emissions from the tank venting system, including a main activated carbon filter and an additional filter element connected to the main activated carbon filter, wherein the additional filter element has at least one adsorbent which, to achieve a high working capacity, in particular at 42° C., has a high micropore volume of at least 0.4 cm³/g, and which to retain a residual loading possibly present in the micropores has a mesopore volume of at least 0.15 cm³/g.

Further preferred features of the additional filter element and the system according to the invention are set forth hereinafter.

DETAILED DESCRIPTION OF THE INVENTION

It will be noted at this point that the following aspects are generally crucial in terms of a functional tank venting system:

1. the emission from the main activated carbon filter is not to exceed a predetermined maximum value;
2. the additional filter element, in the event of a temperature increase from 20° C. to 42° C., must still have a sufficiently high residual capacity to receive the emissions from the main activated carbon filter; and
3. in a situation involving a very low level of loading from the main activated carbon filter it is the own emissions from the additional filter element that dominate. Those emissions from the additional filter element itself are not to exceed a maximum value in a heating cycle in the event of a temperature increase from 20° C. to 42° C.

As indicated hereinbefore, attainment of the first aspect listed above has already been implemented by the development of optimised activated carbon filters in the form of multi-chamber systems, which only still give off a maximum of 50 mg/day of emissions. In some cases the levels of emission given off were even only in the range of between 10 and 20 mg/day.

As the additional filter element, due to ageing, namely the implementation of a plurality of adsorption and desorption cycles, on the one hand builds up a residual loading and on the other hand possibly looses in terms of residual capacity, it is necessary to define the behaviour and characteristics of the additional filter element in the aged condition.

Figure 3:
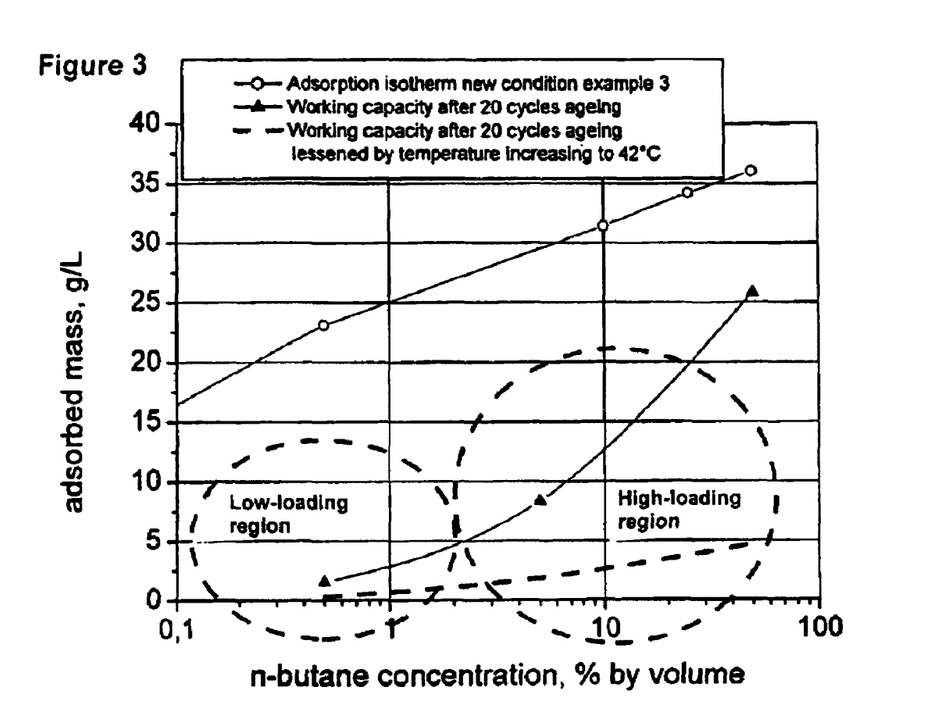
FIG. 3 is a graph showing the distinction between the adsorption characteristics in the new condition and the working capacity after ageing.

In this respect reference will now be made to FIG. 3 showing a fundamental distinction between the adsorption characteristics in the new condition and the working capacity after ageing with 20 cycles with a mixture of n-heptane, n-hexane and n-pentane for above-mentioned Example 3. The working capacity which is involved is quite substantially lessened by an increase in temperature. FIG. 3 clearly shows that basically it is not possible to infer the sorption characteristics after for example 20 ageing cycle with an increase in temperature, from the adsorption isotherm in the new condition. The circle shown in broken line at the right in FIG. 3 marks the region involving high levels of loading concentration as occur during ageing in a real situation during a tank refuelling procedure, while the broken circular line indicated at the left marks the region of low levels of loading concentration as occur during an emission test with an increase in temperature. If very low levels of loading concentration occur, the adsorption potential is reduced to such an extent that desorption takes place. One and the same filter can therefore still have a residual capacity at high levels of loading concentration and can still desorb hydrocarbons at very low levels of loading concentration in addition to the loading effect. It is precisely this that has occurred in relation to the filters from Examples 1 and 2.

Adopting the diagram in FIG. 1 as a basis, such adsorbents are found to be particularly advantageous for use in the residual emission filter constituted by the additional filter element according to the invention, which on the one hand by virtue of their pore structure still have an adequate working capacity even at a temperature of 42° C. and by virtue of the pore structure also well retain a residual loading which is possibly present. A high working capacity, in particular at 42° C., is achieved by virtue of a high micropore proportion which can be quantified by the micropore volume. The capability of retaining the residual loading which is retained in the micropores is influenced, besides the micropore structure, also by a proportion of mesopores which is quantifiable by the mesopore volume.

To implement a defined preageing procedure and to investigate emission characteristics with and without an additional loading, a defined test procedure was developed, as will now be described.

Additional filter elements are preaged in a specific and targeted fashion with a mixture of n-heptane, n-hexane and n-pentane. For that purpose the three substances are put into a washing flask, the outlet of which is in communication with the intake of the additional filter element. An amount of 0.1 l/min of dry air is passed through the washing flask. Using a hydrocarbon sensor, a measurement is made at the discharge flow side of the additional filter element, to ascertain when the breakdown value of 5000 ppm, as butane equivalent, is reached. After the breakdown condition is reached, the filter is flushed with 22 l/min for a period of 15 minutes in the opposite direction. That procedure is repeated for 20 cycles. Subsequently thereto the filter is loaded once again for three cycles with 50% of n-butane in air at 0.1 l/min until breakdown at 5000 ppm occurs and desorption is effected with 22 l/min for a period of 15 minutes. After those three additional cycles the additional filter element is stored in an air-tightly closed container for a period of 16 hours at 23° C. The additional filter element is then fitted into a sealed box of a content of 60 l, by means of a holding arrangement. The holding arrangement is open at one side while connected on the other side is a feed conduit by way of which air or an n-butane/air mixture can be meteredly supplied from the exterior. Fans are provided in the box for circulating the air, together with temperature sensors for determining the temperature there and a hydrocarbon sensor for determining the n-butane concentration. The box is placed with the filter installed therein in an air conditioning cabinet. The cabinet is used to implement a temperature ramp procedure in which the temperature is increased from 20° C. to 42° C. in 12 hours. In parallel relationship with that rise in temperature, an n-butane/air mixture with 50 mg of n-butane is meteredly added in a pulsed procedure by way of the feed conduit to the filter holding arrangement. After the 12 hour period cooling is effected at the same rate again, but now no other substance is meteredly added. That test simulates an activated carbon filter which desorbs an amount of 50 mg of n-butane in a defined fashion over a period of 12 hours. That cycle is implemented twice and the amount of n-butane emitted is then determined.

Figure 4:
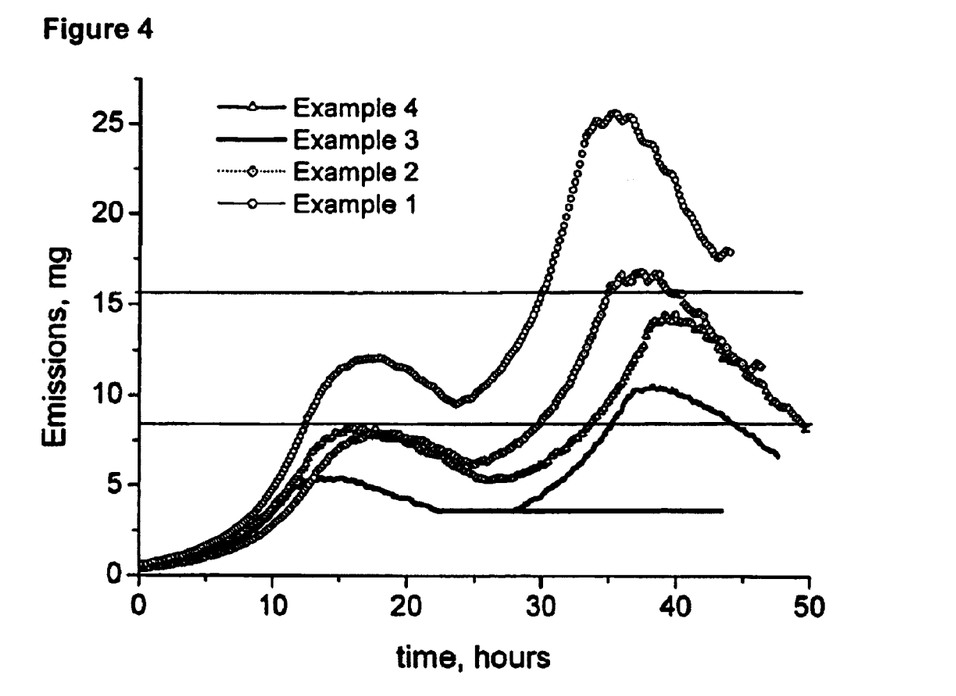
FIG. 4 is a graph illustrating the results of a test showing the difference in the desorption characteristics of the additional filter elements.

In order to investigate the desorption characteristics of the additional filter elements in accordance with Examples 1 through 4, that test was implemented only with a metered addition of 1.0 l of air over a period of 12 hours. The result of this test is shown in FIG. 4. The differences in respect of the various types of filter can be clearly seen. The limit values for the first and second cycles, for later characterisation of the additional filter elements, are shown as horizontal lines. It will be seen that the filter of Example 1 markedly exceeds the limit values in both cycles. The filter of Example 2 exceeds the limit value in the second cycle. In this case therefore an excessively great desorption effect occurs due to air flushing and temperature increase.

For the test in respect of residual capacity and emission characteristics in a situation involving an additional loading, the experiment was then implemented with a metered addition of 50 mg of n-butane over a 12-hour heating phase. As Example 1 already exhibited an excessively high level of emission from the filter itself, that filter, in accordance with Example 1, was no longer involved in the measurement procedure in this experiment.

Figure 5:
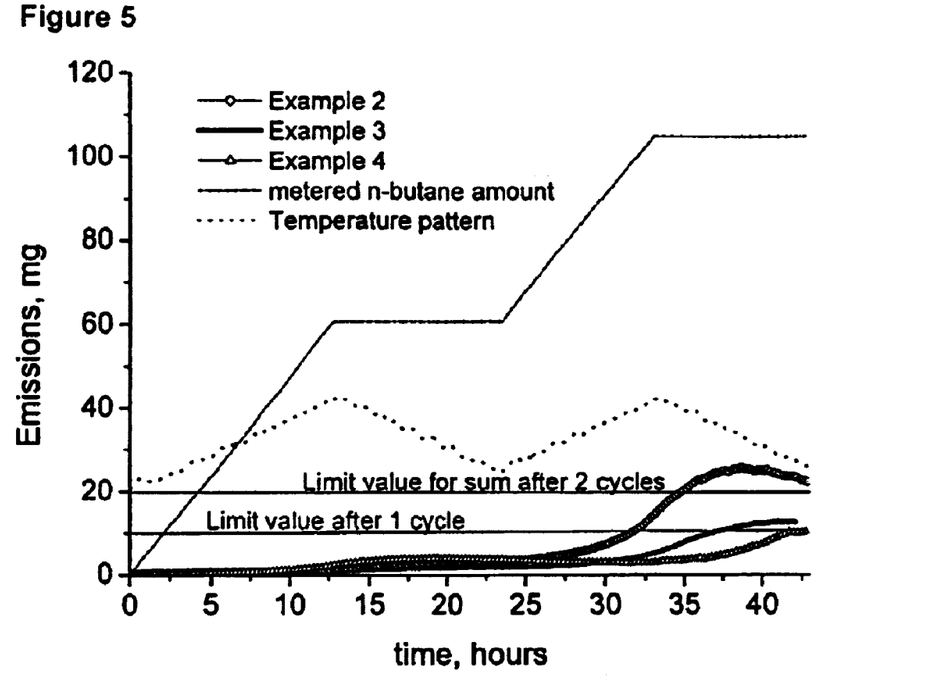
FIG. 5 is a graph showing the results for Examples 2 through 4 together with the curve in respect of the meteredly added n-butane amount.

FIG. 5 shows the results for Examples 2 through 4 together with the curve in respect of the meteredly added n-butane amount. It is worth noting at this juncture that the emission values in the first heating cycle are lower than in the measurement procedure in which metered condition was only effected with air, as shown in FIG. 4. The reason for this is that, in this case, no additional loading is applied but a desorption operation is deliberately performed. As the flushing air does not contain any n-butane the partial pressure drop is so great that desorption occurs.

It will be seen therefore that, in the graph in FIG. 3, the situation here is very far to the left outside the illustrated region. By virtue of the fact that, with an increasing level of n-butane concentration, the loading amount also increases very greatly, the desorption effects very rapidly change to adsorption and finally, upon a further increase in concentration, they become breakdown effects. Those characteristics in respect of the severe loading gradient at low levels of concentration near to zero and the rapid change from desorption to adsorption that this entails is typical in respect of what are referred to as 'favourable' sorption isotherms which exhibit a negative curvature. The normal adsorption and breakdown effects recur with the metered addition of 50 mg in a period of 12 hours.

The result of the loading measurement procedure demonstrates that the residual capacity of the filter of Example 2 was not sufficient to keep the levels of emission in the second cycle below 10 mg or, in terms of the total with the first cycle, below 20 mg. The limit values in respect of the first cycle and the second cycle are each shown by horizontal lines in FIG. 5.

All the data from the experiments with Examples 1 through 4 are set forth in summarising form in Table 3 hereinafter.

TABLE 3

| | Working capacity at 5% n-butane | Emissions in mg with metering of pure air | | Emissions in mg with metering of 50 mg/cycle | |
|---|---|---|---|---|---|
| | | 1st cycle | 2nd cycle | 1st cycle | 2nd cycle |
| Example 1 | 0.2 g | 12 | 26 | — | — |
| Example 2 | 0.45 g | 7.5 | 16 | 4.5 | 26 |
| Example 3 | 0.55 g | 5 | 11 | 1.8 | 12.6 |
| Example 4 | 0.85 g | 8 | 14 | 3.9 | 11.8 |

All details here relate to a filter after preageing with 20 cycles with a mixture of pentane, hexane and heptane in a ratio of 1:1:1.

Prerequisites for the additional filter element for a tank venting system can be deduced from Table 3 above.

The following parameters are established for an operational system:

1. Characterisation of the residual capacity of the additional filter:

After 20 cycles of ageing with a mixture of pentane, hexane and heptane, at 23° C., the additional filter must have a working capacity in relation to 5% n-butane in air of 0.5 g.

2. Characterisation of the inherent emission of the additional filter itself:

After 20 cycles of ageing with a mixture of pentane, hexane and heptane and a subsequent 3 cycles with 50% of n-butane in air and subsequent storage without a flow therethrough at 23° C. for 12 hours, the filter, upon subsequent heating to 42° C., over a period of 12 hours, with a volume throughput rate of 1 l in the 12-hour period, is to give off a maximum amount of 8 g of hydrocarbon (equivalent to C4 n-butane).

3. The main activated carbon filter is to give off at maximum an amount of 100 mg of hydrocarbon (equivalent to C4 n-butane) over the duration of two heating cycles.

A residual emission filter, that is to say an additional filter element according to the invention, with such low inherent emission levels and correspondingly high residual capacity values, is afforded if the adsorbent used is a material which has a micropore volume, as ascertained from the nitrogen isotherm in accordance with Barrett, Joyner and Halenda, of at least 0.4 cm$^3$/g, preferably more than 0.7 cm$^3$/g, and in that respect at the same time has an n-butane working capacity of at least 10 g/100 ml in accordance with ASTM-D5228-92 with 100% n-butane. A sufficiently large mesopore structure must be present for such a working capacity. It has proven to be advantageous if the mesopore volume, ascertained from a mercury intrusion diagram in accordance with the Washburn equation, involves a value of at least 0.15 cm$^3$/g, preferably more than 0.25 cm$^3$/g. In order to prevent the diffusion of hydrocarbons out of the micropores through the mesopores to the exterior and the emissions that this therefore entails, or to keep such diffusion and emission at as low a level as possible, the mesopore volume is not to exceed a given size. It has proven to be advantageous if the mesopore volume, as ascertained from a mercury intrusion diagram in accordance with the Washburn equation, is of a maximum value of 0.95 cm$^3$/g, preferably a maximum of 0.35 cm$^3$/g.

The inherent emissions from the additional filter element itself can be still further improved by virtue of an additional adsorption layer which may optionally also be in the form of an additional adsorption element. That layer is only required to take the remaining between 4 and 10 mg/day. Such an additional layer or additional element may comprise for example a very thin, three-dimensional fiber matrix in which adsorber particles are fixed. A further option is for the additional layer or element to be formed from a highly porous activated carbon body which is pressed in a sieve form and which has adsorber particles of a coarse grain fraction, which are joined together by means of binding agent. A polyamide for example is particularly well suited as a binding agent for such a pressed activated carbon structure. In this respect that adsorbent structure has an adsorption capacity at 25° C. with an n-butane concentration of between 5 and 50% by volume of greater than 35 g of n-butane per liter.

Figure 6:
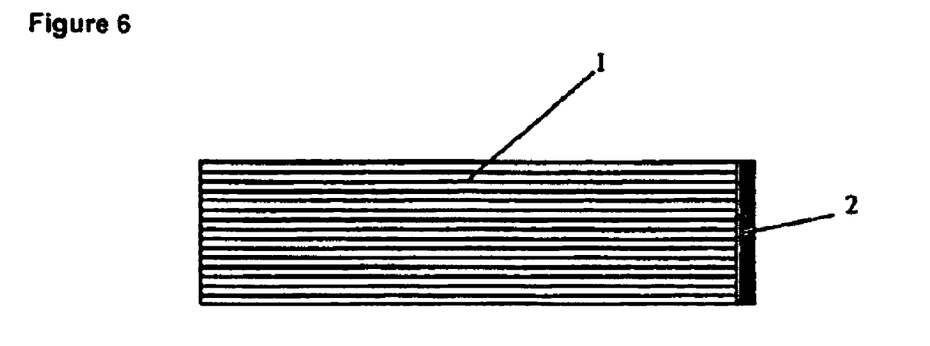
FIG. 6 is a diagram illustrating the structure of an additional filter element according to a first embodiment of the invention.

Reference will now be made to FIG. 6 diagrammatically illustrating the structure of an additional filter element comprising a honeycomb body indicated at 1 with a further flat additional element indicated at 2. In this case the additional element 2 can be fixedly connected to the honeycomb body 1 by means for example of a suitable adhesive. For that purpose, it is possible to use a polyamide, as has already been referred to in relation to the highly porous pressed activated carbon body discussed above.

Besides the additional adsorptive properties of the additional element, the latter, for the desorption situation, also has the useful property that it acts as a diffuser and provides for a homogeneous afflux flow and through flow in respect of the passages in the honeycomb body.

A further reduction in the levels of emission can be achieved by the additional filter element being enclosed in a layer comprising a phase changing material, referred to as a PCM. The PCM layer involves a phase change from crystalline to fluid at between 35° C. and 45° C., preferably at between 39° C. and 42° C. By virtue thereof on the one hand adsorption heat can be received from the additional filter element, whereby the capacity thereof is increased, while on the other hand heat which is supplied from the exterior during a heating phase can be stored and buffered whereby the capacity of the additional filter element is also increased, as the additional filter element heats up only with a considerable time delay and does not reach the final temperature of 42° C. during a CARB cycle.

Figure 7:
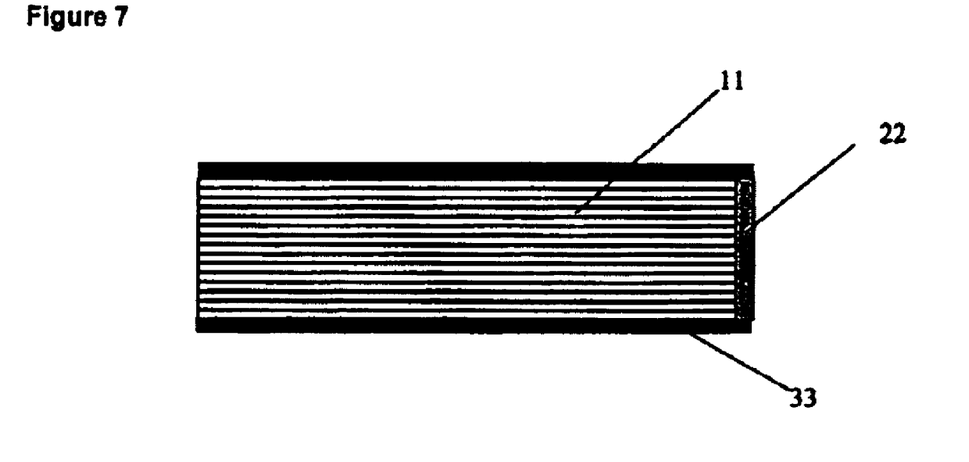
FIG. 7 is a diagram illustrating the structure of an additional filter element according to a second embodiment of the invention.

In this respect, reference will be made to FIG. 7 diagrammatically showing such a structure for an additional filter element. The additional filter element comprises a honeycomb body 11 with an additional element 22, while reference 33 denotes a PCM layer enclosing the honeycomb body 11 and the additional element 22.

It will be appreciated that the above-described aspects and embodiments of the invention have been set forth solely by way of example and illustration of the principles of the invention and that various other modifications and alterations may be made therein without thereby departing from the spirit and scope of the invention.

The invention claimed is:

1. An additional filter element of a filter apparatus for reducing emissions from a tank venting system, which in use is connected to a main activated carbon filter, the additional filter element comprising:
at least one adsorbent which has a high micropore volume and a mesopore volume; and
a filter body with a rear side and a small adsorptive additional element at said rear side, said additional filter element being adapted to produce a relatively small pressure drop and having an adsorption capacity at 25° C. with an n-butane concentration of between 5 and 50% by volume of greater than 35 g of n-butane per liter.

2. The additional filter element as set forth in claim 1 wherein the micropore volume is at least 0.4 cm$^3$/g.

3. The additional filter element as set forth in claim 2 wherein the micropore volume is at least 0.7 cm$^3$/g.

4. The additional filter element as set forth in claim 1 wherein the mesopore volume is at least 0.15 cm$^3$/g.

5. The additional filter element as set forth in claim 4 wherein the mesopore volume is at least 0.25 cm$^3$/g.

6. The additional filter element as set forth in claim 4 wherein the mesopore volume is at a maximum 0.95 cm$^3$/g.

7. The additional filter element as set forth in claim 6 wherein the mesopore volume is at a maximum 0.35 cm$^3$/g.

8. The additional filter element as set forth in claim 1 wherein the filter body has a honeycomb structure.

9. The additional filter element as set forth in claim 1 wherein said additional filter element is including a carrier body comprising a three-dimensional fiber matrix with adsorber particles fixed therein.

10. The additional filter element as set forth in claim 1 wherein said additional filter element is formed by a pressed highly porous activated carbon body in the form of a sieve, said body comprising adsorber particles of a coarse grain fraction and a binding agent joining said adsorber particles together.

11. The additional filter element as set forth in claim 10 including a filter body having a honeycomb structure, and wherein the pressed activated carbon body is fixed to the honeycomb structure filter body by means of said binding agent.

12. The additional filter element as set forth in claim 10 wherein said binding agent is a polyamide binding agent.

13. The additional filter element as set forth in claim 8 and further including a PCM layer enclosing the at least one honeycomb structure filter body and the additional element, said layer involving a phase change in a temperature range of between 35 and 45° C.

14. The additional filter element as set forth in claim 13 wherein said temperature range is between 39° C. and 42° C.

15. The additional filter element as set forth in claim 8 wherein said honeycomb filter structure body comprises at least two honeycomb structure filter body portions.

16. In a hydrocarbon fuel tank venting system a filter arrangement for reducing emissions from the tank venting system, comprising:
a main activated carbon filter; and
an additional filter element connected to the main activated carbon filter;
wherein the additional filter element has at least one adsorbent which has a high micropore volume of at least 0.4 cm$^3$/g, and a mesopore volume of at least 0.15 cm$^3$/g.

17. The system as set forth in claim 16 wherein the micropore volume is at least 0.7 cm$^3$/g.

18. The system as set forth in claim 16 wherein the mesopore volume is at least 0.25 cm$^3$/g.

19. The system as set forth in claim 16 wherein the mesopore volume is at a maximum 0.95 cm$^3$/g.

* * * * *

UNITED STATES PATENT AND TRADEMARK OFFICE
CERTIFICATE OF CORRECTION

PATENT NO. : 7,186,291 B2  Page 1 of 1
APPLICATION NO. : 10/771712
DATED : March 6, 2007
INVENTOR(S) : Thomas Wolff It is certified that error appears in the above-identified patent and that said Letters Patent is hereby corrected as shown below:

Title Page, Item (73) Assignee: Should Read Assignee: Helsa-Automotive GmbH & Co. KG Signed and Sealed this First Day of May, 2007

JON W. DUDAS
*Director of the United States Patent and Trademark Office*